Feb. 4, 1930.  L. R. SEABORN  1,745,455
SOLDERING LADLE
Filed Sept. 25, 1928    2 Sheets-Sheet 1
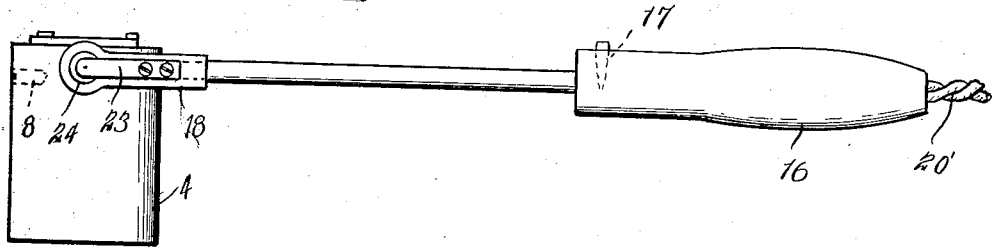
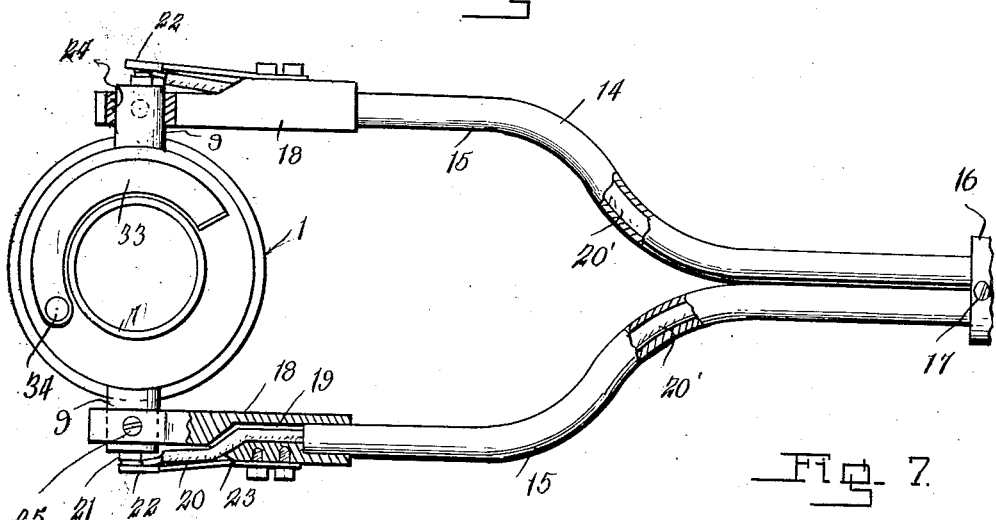
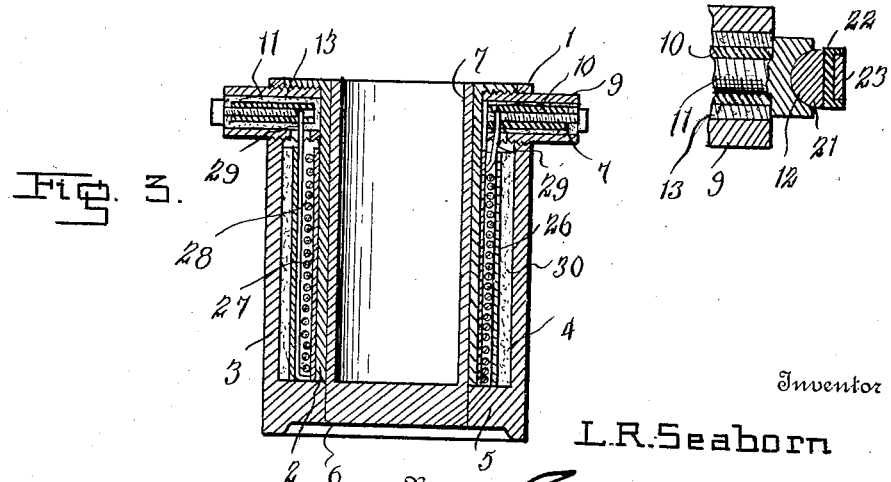
Inventor
L. R. Seaborn
By Lacey & Lacey, Attorneys

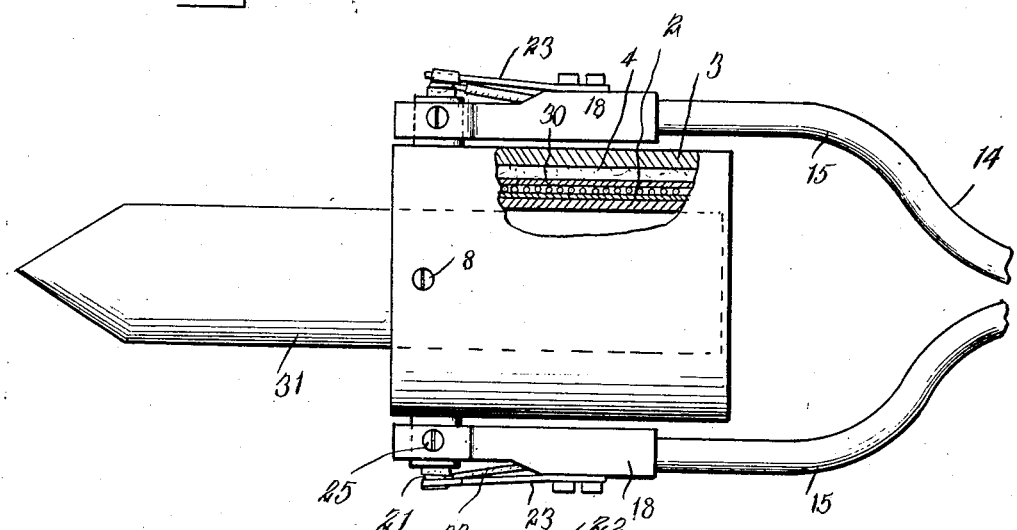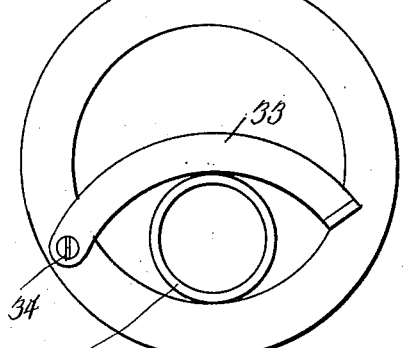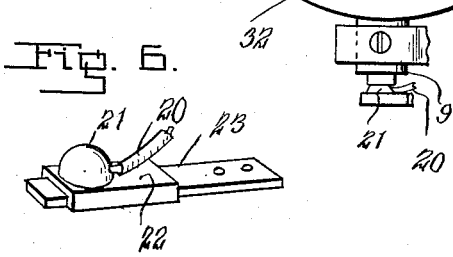

Patented Feb. 4, 1930

1,745,455

UNITED STATES PATENT OFFICE

LENELL R. SEABORN, OF PONCA CITY, OKLAHOMA

SOLDERING LADLE

Application filed September 25, 1928. Serial No. 308,285.

The present invention is directed to improvements in soldering ladles.

The primary object of the invention is to provide a device of this kind so constructed that solder can be quickly heated by a coil capable of being connected with a source of electrical energy.

Another object of the invention is to provide a device of this character constructed and arranged in such manner that the solder containing pot can be readily removed and a copper soldering tip substituted in its place, when desired.

Another object of the invention is to provide a device of this type so constructed that solder and a copper tip can be heated without the aid of a blow torch, as is now the practice, thereby permitting the device to be used around gasoline tanks and engines, or in places where a gas leakage has occurred.

With these and other objects in view, this invention resides in the novel features of construction, formation, combination and arrangement of parts to be hereinafter more fully described, claimed and illustrated in the accompanying drawings, in which:—

Figure 1 is a side view.

Figure 2 is a top plan view, partly in section.

Figure 3 is a vertical sectional view through the holder and pot.

Figure 4 is a top plan view, showing a copper tip engaged in the holder.

Figure 5 is an end view of the holder, showing a wire lug therein.

Figure 6 is a detail, fragmentary, perspective view of one of the contact members.

Figure 7 is a detail sectional view, showing one of the contact members engaged in a contact screw.

Referring to the drawings, 1 designates a holder which consists of inner and outer walls 2 and 3, respectively, spaced to provide an annular chamber 4 having a bottom 5. The inner wall 2 defines an open ended bore 6 in which is removably mounted the solder containing pot 7, said pot being retained in the bore by a set screw 8.

Threaded in the holder are diametrically opposed hollow trunnions 9 in which are mounted interiorly threaded sleeves 10, and engaged in said sleeves are contact screws 11, the heads of which are provided with conical recesses 12, the purpose of which will be later explained. These sleeves are centralized within the trunnions by insulating material 13 of any suitable kind.

The handle 14 is provided and consists of tubular sections 15 which have their outer ends removably secured in a wooden hand grip 16 by a set screw 17. The outer ends of the sections have heads 18 carried thereby in which are formed openings 19 to accommodate the terminals 20 of the electric wires 20′. The wires 20′ are passed through the sections 15 and openings 19, the terminals 20 being fixed to the contact members 21 carried by plates 22 formed of suitable insulating material, said plates being removably mounted upon the spring arms 23. These arms are riveted to the heads 18. The contact members 21 are shaped to snugly engage the recesses 12 of the screws 11.

The heads 18 are provided with bearings 24 rotatably receiving the trunnions 9, said bearings having set screws 25 carried thereby, the purpose of which will appear later.

Mounted in the chamber 4 are concentrically arranged mica sleeves 26 and 27, the latter snugly engaging the inner wall 2. The sleeve 26 is annularly spaced from the sleeve 27 and in this space is located a heating coil 28, the terminals 29 of the coil being extended into the sleeves 10 and are engaged with the screws 11 to complete the circuit through the coil, the heat therefrom obviously serving to heat the wall 2 and the wall of pot 7 in order that solder placed therein will be quickly melted. To protect the outer wall from intensive heat insulating material 30 is packed into the chamber 4 and surrounds the sleeve 26. It will be obvious that solder placed in the pot can be quickly melted and retained in the melted state as long as current is flowing through the coil 28. Since the trunnions 9 are normally free in the bearings 24 the holder 1 will be sustained in a vertical position when the handle 14 is grasped.

When it is desired to use a copper tip 31 it is only necessary to release the set screw 8, whereupon the pot 7 can be removed and the tip 31 inserted in the bore 6, after which the set screw is operated to hold the tip in place, as shown in Figure 4. When the holder is used for this purpose it is necessary that the copper tip be held in a horizontal position and in order to do so the set screws 25 are placed in set engagement with the trunnions 9.

In order that wire terminal lugs 32 can be soldered to a wire an arcuate arm 33 is pivoted to the holder by a binding screw 34. The lug is placed in the bore 6 after the pot 7 is removed in order that the lug will be held tightly against the inner wall 2. The wire is then placed in the lug and solder melted directly in the lug. Upon swinging the arm 33 to the position as shown in Figure 5 and tightening the screw 34 the arm will be held firmly, thus holding the lug. When the solder melts in the lug the lug is gripped with tongs and the arm released, whereupon the lug can be removed to permit the solder to cool quickly.

From the foregoing, it is thought that the construction, operation and many advantages of the herein described invention will be apparent to those skilled in the art, without further description, and it will be understood that various changes in the size, shape, and proportion and minor details of construction, may be resorted to without departing from the spirit or sacrificing any of the advantages of the invention.

What is claimed is:—

1. A device of the class described, comprising a holder having trunnions carried thereby, a handle pivotally connected with the trunnions, said holder having a bore therein, a solder containing pot mounted in the bore, an electrical heating unit within the holder, circuit wires carried by the handle, and means for conducting the current from said wires through the trunnions to the heating unit.

2. A device of the class described, comprising a holder having a bore therein, a pot removably mounted in the bore, an electrical heating unit in the holder for heating the pot, trunnions carried by the holder and having contact screws therein, said screws being connected with the heating unit, a handle pivotally engaged with the trunnions, arms carried by the handle and having contact members thereon for engagement with the contact screws, and circuit wires carried by the handle and engaged with said members.

3. A device of the class described, comprising a holder including inner and outer walls providing an annular chamber, a heating unit confined within the chamber, a pot removably mounted within the holder, trunnions carried by the holder and having contact screws therein, said screws being connected with the heating unit, a handle including a pair of sections, each section being pivotally engaged with a trunnion, arms carried by each section and having contact members thereon for engagement with said screws, and circuit wires carried by the handle sections and connected to the members for conducting current therethrough to the screws and heating unit.

4. A device of the class described comprising a holder having a bore formed therein, a pot removably engaged within the bore, said holder having hollow trunnions carried thereby, contact screws mounted in the trunnions and insulated therefrom, a heating unit confined within the holder and having terminals engaged with said screws, a handle including sections, heads carried by the sections, said heads having arms carried thereby, contact members carried by the arms, circuit wires leading through the arms and connected with said members, said members being adapted to engage the screws.

In testimony whereof I affix my signature.

LENELL R. SEABORN. [L. S.]